United States Patent Office 3,553,227
Patented Jan. 5, 1971

3,553,227
S-2-{[2 - (2 - THIAZOLYLCARBAMOYL)ETHYL] AMINO}ETHYL THIOSULFATE, SALTS THEREOF, AND METHODS FOR THEIR PRODUCTION
Roger D. Westland, Ann Arbor, Mich., assignor to Parke, Davis & Company, Detroit, Mich., a corporation of Michigan
No Drawing. Filed Aug. 5, 1968, Ser. No. 750,020
Int. Cl. C07d 71/34
U.S. Cl. 260—306.8        4 Claims

ABSTRACT OF THE DISCLOSURE

S-2-{[2-(2-thiazolylcarbamoyl)ethyl]amino}ethyl thiosulfate and salts thereof, useful as schistosomacides, and their production by (1) reacting a 3-halo-N-2-thiazolylpropionamide compound with an alkali metal salt of S-2-aminoethyl thiosulfate, (2) reacting a hydrohalide salt of 3-[(2-haloethyl)amino]-N-2-thiazolylpropionamide with a thiosulfate salt in an aqueous solvent medium, and (3) reacting N-2-thiazolyl-1-ethyleneiminopropionamide with thiosulfuric acid or a salt thereof.

---

The present invention relates to new organic thiosulfate compounds that are useful as chemotherapeutic agents and to methods for their production. More particularly, the invention relates to S-2-{[2-(2-thiazolylcarbamoyl)ethyl]amino}ethyl thiosulfate, which has the formula

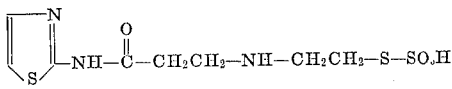

I and to pharmaceutically-acceptable salts thereof.

In accordance with the invention, S-2{[2-(2-thiazolylcarbamoyl)ethyl]amino}ethyl thiosulfate and salts thereof are produced by reacting a 3-halo-N-2-thiazolylpropionamide compound having the formula

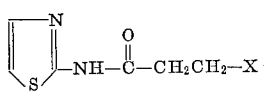

II with an alkali metal salt of S-2-aminoethyl thiosulfate, said salt having the formula $$H_2N-CH_2CH_2-S-SO_3^-M^+$$

III where M represents an alkali metal, preferably sodium, and X is chlorine or bromine. The reaction is normally carried out in a solvent medium. Suitable solvents for this purpose include water; lower alkanols, such as methanol, ethanol, and isopropyl alcohol; ethers, such as dioxane, tetrahydrofuran, and 1,2-dimethoxyethane; and tertiary amides, such as N,N-dimethylacetamide; as well as mixtures of these. Preferred solvents are ethanol and N,N-dimethylacetamide. Neither the temperature nor the duration of the reaction is critical, and both may be varied over a wide range, the temperature from room temperature to about 150° C. and the duration from several hours to several days. With ethanol as the solvent, it is most convenient to carry out the reaction at the reflux temperature of the reaction mixture, and at that temperature, it is normally complete after about 5–50 hours. While equivalent quantities of reactants may be employed, it is preferable to use a moderate excess of the alkali metal salt of S-2-aminoethyl thiosulfate to insure complete reaction. The product of the reaction is initially obtained in salt form and may be isolated directly as such or may be converted to the free acid form by appropriate adjustment of the pH of the reaction mixture.

Also in accordance with the invention, S-2-{[2-(2-thiazolylcarbamoyl)ethyl]amino}ethyl thiosulfate is produced by reacting a hydrohalide salt of a 3-[(2-haloethyl)amino]-N-2-thiazolylpropionamide, said salt having the formula

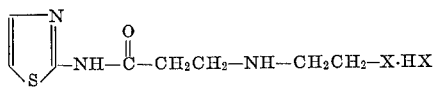

IV with a thiosulfate salt in an aqueous solvent medium; where X is as previously defined. Thiosulfate salts that may be used in this reaction include alkali metal thiosulfates, ammonium thiosulfate, alkaline earth metal thiosulfates, and thallous thiosulfate. The preferred thiosulfate salt is sodium thiosulfate because of its ready availability and ease of use. The solvent medium used for this reaction may be water alone, an aqueous mixture of a lower alkanol, such as methanol, ethanol, and isopropyl alcohol, an aqueous mixture of a water-miscible ether, such as dioxane and tetrahydrofuran, or an aqueous mixture of N,N-dimethylformamide. The temperature and duration of the reaction are not critical. It is most convenient to carry out the reaction at or near the reflux temperature of the reaction mixture, and at that temperature, it is normally complete after a period of from about 30 minutes to several hours. It is preferable to employ equivalent quantities of reactants, although a slight excess of either is not harmful. Except where an excess of thiosulfate salt is used, the completion of the reaction can be determined by acidifying an aliquot of the reaction mixture with mineral acid; failure of sulfur to precipitate indicates that the reaction is essentially complete.

The [(2-haloethyl)amino]-N-2-thiazolylpropionamide hydrohalide salt used as a starting material in the foregoing process is prepared by first reacting 3-chloro-N-2-thiazolylpropionamide (for the preparation of this compound see J. Am. Chem. Soc., vol. 78, page 6123, 1956) with 2-aminoethanol to obtain 3-[(2-hydroxyethyl)-amino]-N-2-thiazolylpropionamide and then reacting this intermediate product with a halogenating agent, such as thionyl chloride, to give the desired 3-[(2-haloethyl)-amino]-N-2-thiazolylpropionamide hydrohalide salt starting material.

Further in accordance with the invention, S-2-{[2-(2-thiazolylcarbamoyl)ethyl]amino}ethyl thiosulfate is produced by reacting N-2-thiazolyl-1-ethyleneiminopropionamide, which has the formula

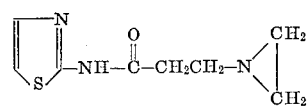

V with thiosulfuric acid or a salt thereof. Suitable salts of thiosulfuric acid that may be used in this reaction are alkali metal thiosulfates, such as sodium thiosulfate, alkaline earth metal thiosulfates, ammonium thiosulfate, and thallous thiosulfate. The reaction is carried out in an unreactive solvent medium, which will vary depending on the thiosulfate reactant used. Suitable solvents for use with thiosulfuric acid are water; lower alkanols, such as methanol and ethanol; ethers, such as diethyl ether, tetrahydrofuran, and dioxane; and lower aliphatic ketones, such as acetone and methyl ethyl ketone; as well as miscible combinations of these. The preferred solvent for use with thiosulfuric acid is methanol. Solvents that may be used for the reaction with an alkali metal thiosulfate, an alkaline earth metal thiosulfate, or thallous thiosulfate are water alone or mixtures of water with any of the following: lower alkanols, dioxane, tetrahydrofuran, 1,2-dimethoxyethane, dimethylsulfoxide, acetone, and methyl ethyl ketone. The preferred solvent is water. In the reaction with ammonium thiosulfate, the following solvents may be used: water; lower alkanols, such as methanol and ethanol; ethers, such as diethyl ether, dioxane, and tetrahydrofuran; dimethylsulfoxide; and aromatic hydrocarbons, such as benzene and toluene; as well as miscible combinations of these. The preferred solvent for use with ammonium thiosulfate is a lower alkanol.

When an alkali metal thiosulfate, an alkaline earth metal thiosulfate, or thallous thiosulfate is used in the foregoing reaction, sufficient acid must be added to the reaction mixture to maintain neutrality (pH about 7–9). In the usual case, a molar equivalent of any of the following acids will be satisfactory for this purpose: hydrochloric acid, sulfuric acid, nitric acid, perchloric acid, formic acid, and acetic acid. Without the acidification step, the reaction will be strongly inhibited by the base that is formed as a secondary product of the reaction. The acidification step is not required when ammonium thiosulfate is used, since the ammonia that is formed as a by-product is not sufficiently basic to inhibit the reaction and may readily be removed from the reaction mixture by heating.

When free thiosulfuric acid is used in this reaction, care must be taken in the preparation and handling of this reactant because of its extreme instability. Free thiosulfuric acid may be prepared by the metathetical reaction of sodium thiosulfate and hydrochloric acid at −78° C. in diethyl ether, or, preferably, by the metathetical reaction of ammonium thiosulfate and sulfuric acid in methanol at −40° C. or below. For use in the reaction with N-2-thiazolyl-1-ethyleneiminopropionamide, the thiosulfuric acid solution should be prepared just prior to use, since the acid will decompose appreciably if kept longer than 4–6 hours even at a temperature of −30° C. The further reaction is then best carried out by slowly adding a cold (−20° C. or below) solution of the N-2-thiazolyl-1-ethyleneiminopropionamide starting material to the freshly prepared thiosulfuric acid solution, maintained at about −40° C., allowing the resulting reaction mixture to warm to room temperature, and then isolating the product after a period of about 10–20 minutes by adding a suitable precipitating solvent, such as diethyl ether, cooling, and filtering. Longer reaction periods and higher temperatures are neither necessary nor desirable. In this reaction, it is best to use equivalent quantities of reactants, although a slight excess of thiosulfuric acid may be used to insure complete reaction.

The conditions for the reaction with a thiosulfate salt are the following. With an alkali metal thiosulfate, an alkaline earth metal thiosulfate, or thallous thiosulfate, the reaction is conveniently carried out at room temperature for a period of about 1–4 hours. The temperature and duration in these cases are not especially critical, however, and may be varied widely. When ammonium thiosulfate is used, the reaction is best carried out at the reflux temperature of the reaction mixture for a period of about 3–4 hours. Other temperatures within the range of 20°–120° C. and other reaction times, from 1–12 hours and longer, may also be used, depending somewhat on the solvent chosen. While equivalent quantities of the reactants may be employed in the reaction with any of these thiosulfate salts, to insure complete reaction, it is preferable to use an excess of the thiosulfate salt.

N-2-thiazolyl-1-ethyleneiminopropionamide, which is used above as a starting material, is prepared by reacting 3-chloro-N-2-thiazolylpropionamide with ethyleneimine in the presence of a base.

S - 2 - {[2 - (2 - thiazolylcarbamoyl)ethyl]amino}-ethyl thiosulfate forms pharmaceutically-acceptable salts with an alkali metal hydroxide, an alkali metal carbonate, an alkali metal alkoxide, a quaternary ammonium hydroxide, or an alkali metal hydride. In the free acid form, S - 2 - {[2 - (2 - thiazolylcarbamoyl)ethyl]amino}ethyl thiosulfate exists as an internal salt that may also be represented by the formula

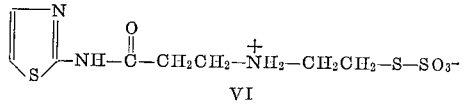

VI

Pharmaceutically-acceptable salts are prepared as described above or by reacting the free acid with a dilute solution of an equivalent amount of the selected base in an unreactive solvent, such as water or a lower alkanol. The preferred salts are the salts of an alkali metal, which are preferably prepared by reacting S-2-{[2-(2-thiazolylcarbamoyl)ethyl]amino}ethyl thiosulfate in free acid form with an equivalent amount of an alkali metal hydroxide in water.

S - 2 - {[2 - (2 - thiazolylcarbamoyl)ethyl]amino}ethyl thiosulfate, in free acid and in pharmaceutically-acceptable salt form, is useful as a chemotherapeutic agent, especially as an anti-parasitic agent that is an active schistosomacide. Its activity in this regard can be demonstrated and quantitatively measured in a standard test against *Schistosoma mansoni* in mice, which is carried out as described in American Journal of Tropical Medicine and Hygiene, vol. 11, No. 1, pages 31–45, January 1962. The results obtained in this test for S-2-{[2-(2-thiazolylcarbamoyl)ethyl]amino}ethyl thiosulfate (designated "free acid") and for the potassium salt thereof are summarized in the table below.

SCHISTOSOMACIDAL ACTIVITY

| Compound | Dose,[a] mg./kg./day/days | Number of mice treated[b] | Reduction in live worm burden, percent |
|---|---|---|---|
| Free acid | 338/14 | 6 | 99.7 |
| Potassium salt | 363/14 | 6 | 82 |

[a] Administered in the diet at a concentration of 0.25%.
[b] The mice were autopsied at the end of the 14-day treatment period.

The invention is illustrated by the following examples.

EXAMPLE 1

To a solution of 53.7 g. of sodium S-2-aminoethyl thiosulfate and 1.0 g. of potassium iodide in 300 ml. of absolute ethanol, heated under reflux, is added in portions over a period of 2–5 hours 30.0 g. of 3-chloro-N-2-thiazolylpropionamide, and the resulting mixture is heated under reflux for 50 hours. Upon cooling, the reaction mixture is neutralized with glacial acetic acid, and the neutralized mixture is concentrated to small volume. The concentrated mixture is diluted with water, and the solid S - 2 {[2 - (2 - thiazolylcarbamoyl)ethyl]amino}ethyl thiosulfate that precipitates is isolated by filtration, washed with ether, and dried; M.P. 232° C. (with decomposition), following a number of crystallizations from water.

To a stirred suspension of 15.6 g. of S-2-{[2-(2-thiazolylcarbamoyl)ethyl]amino}ethyl thiosulfate in 200 ml. of water is added 50.5 ml. of 0.99 N potassium hydroxide, and the resulting mixture is stirred at room temperature for two hours and then evaporated to dryness. The solid residue, which is S-2-{[2-(2-thiazolylcarbamoyl)ethyl]-amino}ethyl thiosulfate, potassium salt, is isolated, washed with acetone, and dried; M.P. 166–169° C., following crystallization from ethanol-ether.

EXAMPLE 2

A mixture consisting of 5.0 g. of 3-[(2-chloroethyl)-amino]-N-2-thiazolylpropionamide hydrochloride, 5.0 g. of sodium thiosulfate pentahydrate, and 100 ml. of water is heated on a steam bath for one hour and then cooled to give a solid precipitate of S-2-{2-(2-thiazolylcarbamoyl)ethyl]amino}ethyl thiosulfate, which is isolated, dried, and crystallized from water; M.P. 232° C. (with decomposition).

To a stirred suspension of 3.1 g. of S-2-{[2-(2-thiazolylcarbamoyl)ethyl]amino}ethyl thiosulfate in 50 ml. of water is added 10.0 ml. of 1.0 N sodium hydroxide, and the resulting mixture is stirred at room temperature for 2 hours and then evaporated to dryness. The solid residue is triturated with 15 ml. of hot isopropyl alcohol, ground in a mortar under fresh isopropyl alcohol, and then isolated by filtration and dried under vacuum at 40° C. overnight. It is S-2-{[2-(2-thiazolylcarbamoyl)-ethyl]amino}ethyl thiosulfate, sodium salt; M.P. 110–125° C.

The 3 - [(2-chloroethyl)amino] - N - 2 - thiazolylpropionamide hydrochloride starting material is prepared as follows. A mixture of 38.0 g. of 3-chloro-N-2-thiazolylpropionamide and 160 ml. of 2-aminoethanol is stirred at 50–60° C. for 4 hours, cooled, and filtered to give 3-[(2-hydroxyethyl)amino] - N - 2 - thiazolylpropionamide; M.P. 139–142° C., following crystallization from isopropyl alcohol. This intermediate product (25 g.) is carefully added to 250 ml. of thionyl chloride at 0–10° C., and the resulting mixture is stirred at room temperature overnight. It is then heated at 50–60° C. for one hour and evaporated to give 3-[(2-chloroethyl)amino]-N-2-thiazolylpropionamide hydrochloride; M.P. 222–224° C., following crystallization from ethanol.

EXAMPLE 3

A mixture consisting of 5.0 g. of N-2-thiazolyl-1-ethyleneiminopropionamide, 4.0 g. of ammonium thiosulfate, and 80 ml. of ethanol is heated under reflux for 3 hours and then evaporated to dryness to give S-2-{[2-(2-thiazolylcarbamoyl)ethyl]amino}ethyl thiosulfate; M.P. 232° C. (with decomposition), following crystallization from water.

The N-2-thiazolyl-1-ethyleneiminopropionamide starting material is obtained as follows. To a mixture of 7.2 g. of powdered anhydrous potassium carbonate and 100 ml. of ethyleneimine cooled in an ice-bath is added 10.0 g. of 3-chloro-N-2-thiazolylpropionamide. The cooling bath is then removed, whereupon the reaction temperature rises spontaneously to about 40° C. Upon cooling again to room temperature, the mixture is concentrated, and the solid residue obtained is extracted 4 times with boiling benzene. The combined extracts are filtered through diatomaceous silica, and the filtrate is concentrated to a volume of about 100 ml. The solid that precipitates is isolated by filtration, and the filtrate is again concentrated to yield additional solid. The combined solids are then crystallized from benzene to give the desired N-2-thiazolyl-1-ethyleneiminopropionamide; M.P. 145–147.5° C.

I claim:
1. A member of the class consisting of S-2-{[2-(2-thiazolylcarbamoyl)ethyl]amino}ethyl thiosulfate and pharmaceutically-acceptable salts thereof.
2. A compound according to claim 1 which is S-2-{[2-(2-thiazolylcarbamoyl)ethyl]amino}ethyl thiosulfate.
3. A compound according to claim 1 which is S-2-{[2-(2-thiazolylcarbamoyl)ethyl]amino}ethyl thiosulfate, potassium salt.
4. A compound according to claim 1 which is S-2-{[2-(2-thiazolylcarbamoyl)ethyl]amino}ethyl thiosulfate, sodium salt.

References Cited

Dow, Ethylenimine, © 1965, p. 5.
Wagner et al., Synthetic Organic Chemistry, Wiley, 1953, 666–70, 797.

ALEX MAZEL, Primary Examiner

R. J. GALLAGHER, Assistant Examiner

U.S. Cl. X.R.

424—270